(12) United States Patent (10) Patent No.: US 12,576,882 B2
Lechner et al. (45) Date of Patent: Mar. 17, 2026

---

(54) METHOD AND DEVICE FOR PRIORITIZING ROUTE INCIDENTS

(71) Applicant: Bayerische Motoren Werke Aktiengesellschaft, Munich (DE)

(72) Inventors: Andreas Lechner, Munich (DE); Sebastien Mathieu, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 129 days.

(21) Appl. No.: 18/573,488

(22) PCT Filed: Jun. 20, 2022

(86) PCT No.: PCT/EP2022/066710
§ 371 (c)(1),
(2) Date: Dec. 22, 2023

(87) PCT Pub. No.: WO2022/268705
PCT Pub. Date: Dec. 29, 2022

(65) Prior Publication Data
US 2024/0367677 A1 Nov. 7, 2024

(30) Foreign Application Priority Data

Jun. 24, 2021 (DE) .................... 10 2021 116 331.5

(51) Int. Cl.
 *B60W 60/00* (2020.01)
 *B60W 30/14* (2006.01)
 *B60W 50/00* (2006.01)
(52) U.S. Cl.
 CPC ........ *B60W 60/001* (2020.02); *B60W 30/143* (2013.01); *B60W 50/0097* (2013.01); *B60W 2555/00* (2020.02); *B60W 2720/103* (2013.01)

(58) Field of Classification Search
 CPC ......... B60W 2552/30; B60W 2555/00; B60W 2556/50; B60W 2720/103; B60W 30/143; B60W 50/0097; B60W 60/001
 See application file for complete search history.

(56) References Cited

U.S. PATENT DOCUMENTS

| | | | |
|---|---|---|---|
| 2017/0261991 A1 | 9/2017 | Raghu | |
| 2019/0106108 A1 | 4/2019 | Wieneche et al. | |

(Continued)

FOREIGN PATENT DOCUMENTS

| | | |
|---|---|---|
| DE | 10 2006 006 365 A1 | 8/2007 |
| DE | 10 2015 000 538 A1 | 7/2016 |

(Continued)

OTHER PUBLICATIONS

C1 International Search Report (PCT/ISA/210) issued in PCT Application No. PCT/EP2022/066710 dated Aug. 31, 2022 with English translation (4 pages).

(Continued)

*Primary Examiner* — Wade Miles
*Assistant Examiner* — Zachary Joseph Wallace
(74) *Attorney, Agent, or Firm* — Crowell & Moring LLP

(57) ABSTRACT

Methods, systems, and apparatuses for analyzing upcoming route incidents on a driving route of a vehicle in the automated longitudinal guidance of the vehicle are provided. A first upcoming route incident at a first incident position is detected on the driving route of the vehicle. A first speed profile of the vehicle is predicted up to the first incident position considering the first route incident in the automated longitudinal guidance of the vehicle. Based on the first speed profile, it is determined whether or not a second route incident becomes relevant to the automated longitudinal guidance of the vehicle before the first incident position is reached. The automated longitudinal guidance of the vehicle (Continued)

is affected on the driving route up to the first incident position at least in certain areas based on the second route incident if it is determined that the second route incident or no further route incident at all becomes relevant to the automated longitudinal guidance of the vehicle before the first incident position is reached.

12 Claims, 2 Drawing Sheets

(56) References Cited

U.S. PATENT DOCUMENTS

| | | | |
|---|---|---|---|
| 2020/0031346 A1 | 1/2020 | Lipot et al. | |
| 2020/0377090 A1 * | 12/2020 | Seccamonte | B60W 60/0011 |
| 2024/0075927 A1 * | 3/2024 | Seccamonte | G06N 5/01 |

FOREIGN PATENT DOCUMENTS

| | | |
|---|---|---|
| DE | 10 2017 102 076 A1 | 7/2018 |
| DE | 10 2018 212 519 A1 | 1/2020 |

OTHER PUBLICATIONS

German-language Written Opinion (PCT/ISA/237) issued in PCT Application No. PCT/EP2022/066710 dated Aug. 31, 2022 with English translation (9 pages).
German Search Report issued in German Application No. 10 2021 116 331.5 dated Jan. 28, 2022 with partial English translation (12 pages).

* cited by examiner

METHOD AND DEVICE FOR PRIORITIZING ROUTE INCIDENTS

BACKGROUND AND SUMMARY

The present subject matter relates to a method and a corresponding device for analyzing route incidents in the automated longitudinal guidance of a vehicle.

A vehicle may comprise one or more driving functions which assist the driver of the vehicle with the longitudinal guidance of the vehicle. Exemplary driving functions are a distance and speed control system (in particular Adaptive Cruise Control, ACC), a driving function for automatically analyzing speed limits and/or a driving function for automatically analyzing structural route incidents (for example bends).

A route incident is typically associated with a specific incident position at which the vehicle should have or at least should not exceed a specific driving speed. In this sense, a traffic sign with a specific speed limit can also be considered to be a route incident. One or more different types of route incidents (for example speed limits and/or bends) can therefore be considered within the scope of one or more driving functions of the vehicle.

A driving function for automatically analyzing route incidents in the longitudinal guidance of a vehicle may be configured to determine a deceleration strategy (for example in the form of a target speed profile) starting from the current vehicle position in order to cause the vehicle to have the driving speed associated with the route incident at the incident position. In this case, the deceleration strategy may determine an intervention position, which is typically between the vehicle position and the incident position, from which the deceleration strategy becomes relevant to the automated longitudinal guidance of the vehicle. From the intervention position, automated longitudinal guidance of the vehicle can then be carried out according to the determined deceleration strategy (in particular according to the determined target speed profile).

A plurality of different route incidents which possibly follow one another very closely may be on an upcoming driving route of a vehicle. The different deceleration strategies for the route incidents may possibly result in an uncomfortable driving behavior of the vehicle, in particular on account of transitions between different deceleration strategies.

The present document deals with the technical object of providing a driving function for automatically analyzing route incidents, which enables a particularly high degree of driving comfort.

One aspect describes a device for analyzing upcoming route incidents on a driving route of a vehicle in the automated longitudinal guidance of the vehicle. Example route incidents are a bend on a road and/or a speed limit (which is indicated by a traffic sign, for example). The different route incidents may be indicated in a digital map relating to the road network used by the vehicle. Alternatively, or additionally, route incidents may be recognized on the basis of the environmental data from one or more environmental sensors of the vehicle.

The individual route incidents may each be associated with an incident speed (which is indicated in the digital map, for example) which the vehicle should have or should not exceed at the incident position of the route incident (which is indicated in the digital map, for example).

The device may be configured to analyze the incident speeds of the different route incidents on the driving route used by the vehicle in the automated longitudinal guidance of the vehicle, in particular in such a manner that the vehicle has or does not exceed the respectively indicated incident speed at the respective incident position. For this purpose, the device may determine, for each of the individual route incidents, target speed profiles which can be used to control the driving speed when approaching the respective incident position.

The device may therefore be configured to determine, for a recognized route incident, a target speed profile for automated deceleration of the vehicle (to the respective incident speed) up to the respective incident position. The target speed profile may have different phases in this case. Example phases are a coasting phase (with a decoupled drive motor), an overrun phase (when using the thrust torque of the drive motor to decelerate the vehicle) and/or a braking phase (when one or more brakes are (additionally) used to decelerate the vehicle).

The composition and/or the duration of the different phases within a target speed profile may be different for different types of route incidents. In this case, the different phases can be used to adapt the driving behavior of the vehicle to a typical driving behavior of a human driver.

Example types of route incidents are speed limits or bends. The deceleration behavior of the vehicle may be different for the different types of route incidents (which can be caused by different target speed profiles).

Alternatively, or additionally, the total distance which is covered by the vehicle within the scope of a target speed profile when approaching a route incident may depend on the type of route incident. For example, the total distance for route incidents of a first type (for example speed limits) may tend to be higher than for route incidents of a second type (for example bends).

This document mentions positions and distances. It should be pointed out that a position of the vehicle over the driving speed of the vehicle is associated with a corresponding point in time. This accordingly applies to a distance covered by the vehicle. The terms "position" and/or "distance" and/or "spacing" can therefore be respectively replaced by the terms "point in time" and/or "period" and/or "interval of time". This also applies to the claims, in particular.

The device is configured to detect a first upcoming route incident at a first incident position on the driving route of the vehicle (for example on the basis of the digital map in combination with the current position of the vehicle, and/or on the basis of environmental data from one or more environmental sensors of the vehicle). The first route incident may have the first type of route incident. Furthermore, the first route incident may be associated with a first incident speed which the vehicle should have or should not exceed at the first incident position.

The device may be configured to determine or predict a first speed profile (in particular a first target speed profile) on the basis of the first incident speed of the first route incident, in particular in such a manner that the driving speed of the vehicle, starting from the (current) initial speed, is reduced to the first incident speed at the first incident position. The first target speed profile may begin at a first intervention position, wherein the first intervention position is the position from which the first target speed profile is used for the automated longitudinal guidance of the vehicle. The first intervention position may be the current vehicle position.

The device may be configured (as standard) to use the first target speed profile for the automated longitudinal guidance of the vehicle up to the first incident position, in particular when it is determined that no further route incident (in particular no further route incident at all) becomes relevant to the automated longitudinal guidance of the vehicle before the first incident position is reached. Comfortable longitudinal guidance of the vehicle can therefore be achieved.

The device may therefore be configured to predict or determine a first speed profile, in particular a first target speed profile, of the vehicle up to the first incident position, assuming that (possibly only) the first route incident (and no further route incident) is considered in the automated longitudinal guidance of the vehicle.

The device is also configured to determine, on the basis of the first speed profile, whether or not a second route incident becomes relevant to the automated longitudinal guidance of the vehicle before the first incident position is reached. For this purpose, the device may be configured to determine a target speed (in particular the second incident speed of the second route incident) which the vehicle should have or should not exceed on account of the second route incident at a specific position (in particular at the second incident position) before the first incident position is reached. This information may be determined on the basis of the digital map and/or on the basis of the environmental data from the one or more environmental sensors of the vehicle.

The target speed (in particular the second incident speed) can then be compared with the first speed profile, in particular with the first speed indicated by the first speed profile at the specific position (in particular at the second incident position). It is then possible to determine, on the basis of the comparison, whether or not the second route incident becomes relevant to the automated longitudinal guidance of the vehicle before the first incident position is reached. In particular, it is possible to determine that the second route incident becomes relevant to the automated longitudinal guidance of the vehicle before the first incident position is reached if the target speed (in particular the second incident speed) is less than the first speed (and therefore below the first speed profile). On the other hand, it is possible to determine that the second route incident is not relevant to the automated longitudinal guidance of the vehicle up to the first incident position.

The device is also configured to affect the automated longitudinal guidance of the vehicle on the driving route up to the first incident position at least in certain areas on the basis of the second route incident (and/or without considering the first route incident) if it is determined that the second route incident becomes relevant to the automated longitudinal guidance of the vehicle before the first incident position is reached.

In particular, the device may be configured to analyze only the second route incident and not the first route incident in the automated longitudinal guidance of the vehicle until the second incident position is reached. The first route incident can therefore be disregarded in the automated longitudinal guidance (until the second incident position is reached) if it is determined that the second route incident becomes relevant to the automated longitudinal guidance of the vehicle before the first incident position is reached.

Particularly comfortable automated longitudinal guidance, analyzing a plurality of route incidents, can therefore be enabled in a robust manner.

The device may be configured, if it is determined that the second route incident becomes relevant to the automated longitudinal guidance of the vehicle before the first incident position is reached, to determine a second target speed profile on the basis of the second incident speed of the second route incident, in particular in such a manner that the driving speed of the vehicle, starting from an initial speed (for example the current vehicle speed) at a second intervention position, is reduced to the second incident speed at the second incident position. The second intervention position may be the position from which the second target speed profile (and therefore the second route incident) is used in the automated longitudinal guidance of the vehicle. The second intervention position is typically after the first intervention position in the direction of travel of the vehicle.

The automated longitudinal guidance of the vehicle on the driving route (from the second intervention position) up to the second incident position can then be affected (possibly solely) on the basis of the second target speed profile. A particularly comfortable driving behavior can therefore be achieved.

The device may also be configured to determine a residual target speed profile on the basis of the first incident speed of the first route incident at the first incident position, in particular in such a manner that the driving speed of the vehicle, starting from the second incident speed at the second incident position, is reduced to the first incident speed at the first incident position. The automated longitudinal guidance of the vehicle can then be affected on the driving route from the second incident position to the first incident position (possibly solely) on the basis of the residual target speed profile.

As stated further above, the device may be configured to determine a first target speed profile for the first route incident, wherein the first target speed profile begins from the first intervention position which is typically arranged before the second intervention position in the direction of travel of the vehicle.

The device may be configured to ignore the first target speed profile for the first route incident during the automated longitudinal guidance of the vehicle between the first intervention position and the second intervention position if it is determined that the second route incident becomes relevant to the automated longitudinal guidance of the vehicle before the first incident position is reached. The automated longitudinal guidance can then be continued, for example by a distance and speed controller, until the second intervention position is reached. From the second intervention position, the second target speed profile can then be used for the automated longitudinal guidance of the vehicle. A particularly comfortable driving behavior can therefore be achieved.

As already stated above, the first route incident may have the first type and the second route incident may have the second type. The device may be configured to determine, for a route incident of the first type, a target speed profile for automated deceleration that extends over a longer total distance than a target speed profile for automated deceleration for a route incident of the second type. The comfort of the automated longitudinal guidance can be increased further by adapting the distance of automated deceleration to the type of route incident.

A further aspect describes a (road) motor vehicle (in particular an automobile or a truck or a bus or a motorcycle) which comprises the device described in this document.

A further aspect describes a method for analyzing upcoming route incidents on a driving route of a vehicle in the automated longitudinal guidance of the vehicle. The method comprises detecting a first upcoming route incident at a first incident position on the driving route of the vehicle. The driving route may have been planned in a navigation system of the vehicle, for example.

The method also comprises determining a first speed profile of the vehicle up to the first incident position, assuming that the first route incident is considered in the automated longitudinal guidance of the vehicle. The method also comprises determining, on the basis of the first speed profile, whether or not a second route incident becomes relevant to the automated longitudinal guidance of the vehicle before the first incident position is reached. The method also comprises affecting the automated longitudinal guidance of the vehicle (in particular the control of the driving speed of the vehicle) on the driving route up to the first incident position at least in certain areas on the basis of the second route incident (and without considering the first route incident) if it is determined that the second route incident becomes relevant to the automated longitudinal guidance of the vehicle before the first incident position is reached.

A further aspect describes a software (SW) program. The SW program may be configured to be executed on a processor (for example on an electronic control unit of a vehicle) and to thereby carry out the method described in this document.

A further aspect describes a non-transitory computer-readable storage medium. The storage medium may comprise a SW program which is configured to be executed on a processor and to thereby carry out the method described in this document.

It should be noted that the methods, devices and systems described in this document can be used both alone and in combination with other methods, devices and systems described in this document. Furthermore, any aspects of the methods, devices and systems described in this document can be combined with one another in various ways. In particular, the features of the claims can be combined with one another in various ways.

DETAILED DESCRIPTION OF THE DRAWINGS

Figure 1:
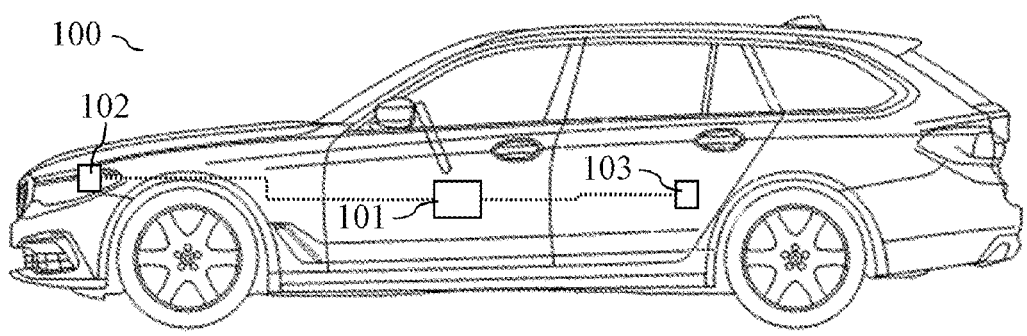
FIG. 1 shows example components of a vehicle.

As stated at the outset, the present document deals with increasing the comfort of a driving function for automatically analyzing route incidents on the driving route used by a vehicle. In this context, FIG. 1 shows exemplary components of a vehicle 100. The vehicle 100 comprises one or more environmental sensors 102 (for example a radar sensor, a lidar sensor, a camera, an ultrasonic sensor, etc.) which are configured to capture environmental data (that is to say sensor data) relating to the environment of the vehicle 100. A (control) device 101 of the vehicle 100 is configured to operate one or more actuators 103 for the automated (longitudinal) guidance of the vehicle 100 on the basis of the environmental data in order to provide one or more driving functions. The one or more actuators 103 may comprise a drive motor of the vehicle 100 and/or one or more (friction) brakes of the vehicle 100.

An example driving function is a distance and speed controller which is configured to automatically adapt the driving speed of the vehicle 100 on the basis of the distance between the vehicle 100 and a leading vehicle driving directly in front of the vehicle 100 and/or on the basis of a set speed that has been set. A further example driving function is configured to consider route incidents on the driving route used by the vehicle 100 in the longitudinal guidance of the vehicle.

Figure 2:
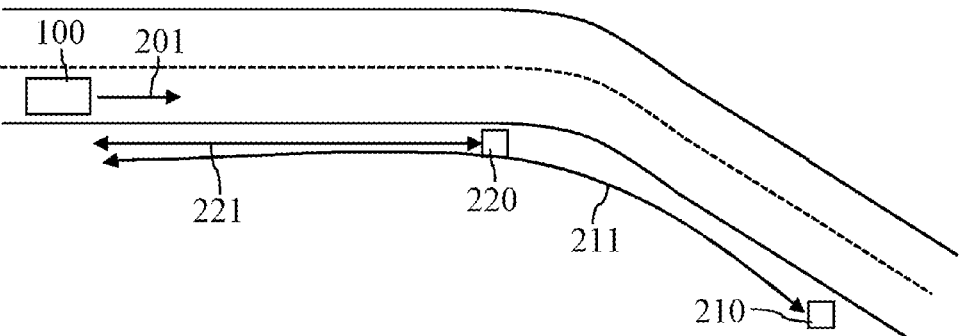
FIG. 2 shows example route incidents on a driving route.

FIG. 2 shows an example road on which the vehicle 100 is moving at a specific driving speed 201. A plurality of route incidents 210, 220 are arranged on the road along the driving route of the vehicle 100. In particular, a speed limit as a first route incident 210 is situated at a first distance 211 in front of the vehicle 100. Furthermore, a bend as a second route incident 220 is situated at a second distance 221 in front of the vehicle 100 in the direction of travel. In the example illustrated in FIG. 2, the second route incident 220 is before the first route incident 220 in the direction of travel of the vehicle 100.

The route incidents 210, 220 may be recorded in a digital map relating to the road used by the vehicle 100 (in particular relating to the road network used by the vehicle 100). One or more incident attributes may each be stored or indicated in the digital map for the individual route incidents 210, 220. Example incident attributes are:
the incident position (for example as coordinates of a global navigation satellite system, GNSS);
the target speed and/or the speed limit of the vehicle 100 at the incident position (which is also referred to as the incident speed); and/or
the type of route incident (for example bend or speed limit).

The individual route incidents 210, 220 and/or incident attributes may possibly be alternatively or additionally determined on the basis of the environmental data.

The above-mentioned driving function for automatically analyzing route incidents may be configured to detect an upcoming route incident 210, 220 in the direction of travel on the basis of the digital map and/or on the basis of the environmental data. The driving function may also be configured to determine a target speed profile of the vehicle 100 on the basis of the one or more incident attributes, wherein the target speed profile can be used for the automated longitudinal guidance of the vehicle 100 until the incident position of the detected route incident 210, 220 is reached (as a target specification for a speed controller).

Figure 3:
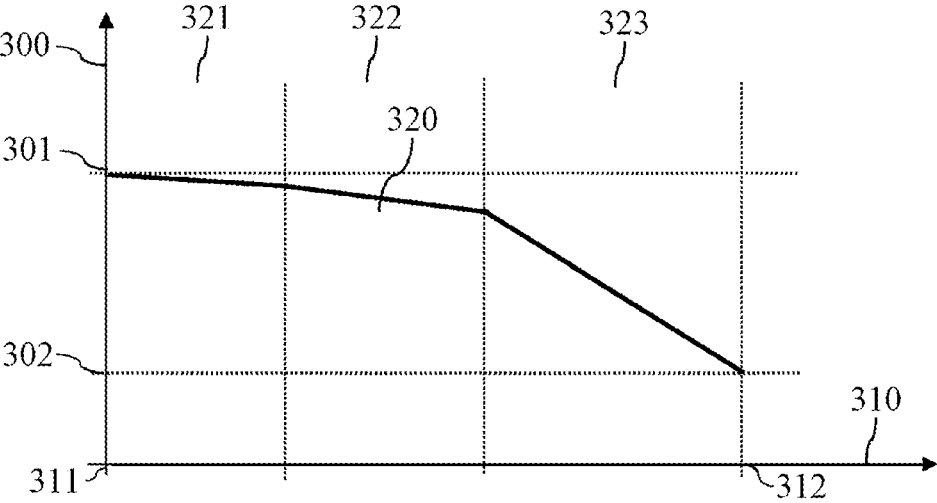
FIG. 3 shows an example target speed profile for a route incident.

FIG. 3 shows an example target speed profile 320 for the automated longitudinal guidance of the vehicle 100 up to the incident position 312 of an upcoming route incident 210, 220. The target speed profile 320 indicates the target speed 300 of the vehicle 100 as a function of the position 310. It should be pointed out that the aspects described in this document for a position and for a spatial distance accordingly apply to a point in time and an interval of time. In this case, the position and the spatial distance over the driving speed 201 of the vehicle 100 can be converted into a point of time and into an interval of time.

The target speed profile 320 begins at an intervention position 311, from which the route incident 210, 220 under consideration becomes relevant to the automated longitudinal guidance of the vehicle 100 (and the target speed profile 320 is used as the target specification for the speed controller of the vehicle 100). From the intervention position 311, the automated longitudinal guidance of the vehicle 100 can be carried out on the basis of the determined target speed profile 320, in particular in order to cause the vehicle 100 to have the incident speed 302 of the route incident 210, 220 at the incident position 312.

The target speed profile 320 can begin with an initial speed 301 at the intervention position 311. The vehicle 100 can then be operated in different deceleration modes between the intervention position 311 and the incident position 312. For example, the vehicle 100 can be operated, in a first phase 321 of the target speed profile 320, in a coasting mode in which the drive motor of the vehicle 100 is decoupled and the vehicle 100 drives along the driving route largely without braking. In a second phase 322, the vehicle 100 can possibly be operated in an overrun mode in which the drive motor of the vehicle 100 is coupled in and therefore causes a braking torque on the vehicle 100. Furthermore, in a third phase 323, the vehicle 100 can be actively decelerated by actuating the one or more brakes.

The target speed profile 320 for a route incident 210, 220, in particular the total temporal and/or spatial duration (between the intervention position 311 and the incident position 312) and/or the duration of the different phases 321, 322, 323, may depend on the actual speed 201 of the vehicle 100 when the route incident 210, 220 is identified and/or at the intervention position 311; and/or the type of route incident 210, 220.

For example, a different target speed profile 320 may be determined for a speed limit 210 than for a bend 220.

Adapting the target speed profiles 320 to the type of respective route incident 210, 220 makes it possible to adapt the driving behavior of the vehicle 100 to the typical behavior of human drivers, thus making it possible to increase the comfort of the driving function. On the other hand, the use of different target speed profiles 320 can result in an uncomfortable, in particular abruptly changing, driving behavior of the vehicle 100 if different route incidents 210, 220 follow one another relatively closely (and as a result there are abrupt transitions between the target speed profiles 320 for the different route incidents 210, 220).

On account of the different properties of the target speed profiles 320 for different route incidents 210, 220, in particular on account of the different total duration of the different target speed profiles 320, the result may be a situation in which a second route incident 220 becomes relevant to the longitudinal guidance of the vehicle 100, while the vehicle 100 is being longitudinally guided in an automated manner according to the target speed profile 320 of a first route incident 210. This may result in an abrupt change, in particular reduction, in the target speed 300 of the vehicle 100 and thus an uncomfortable driving behavior of the vehicle 100.

Figure 4:
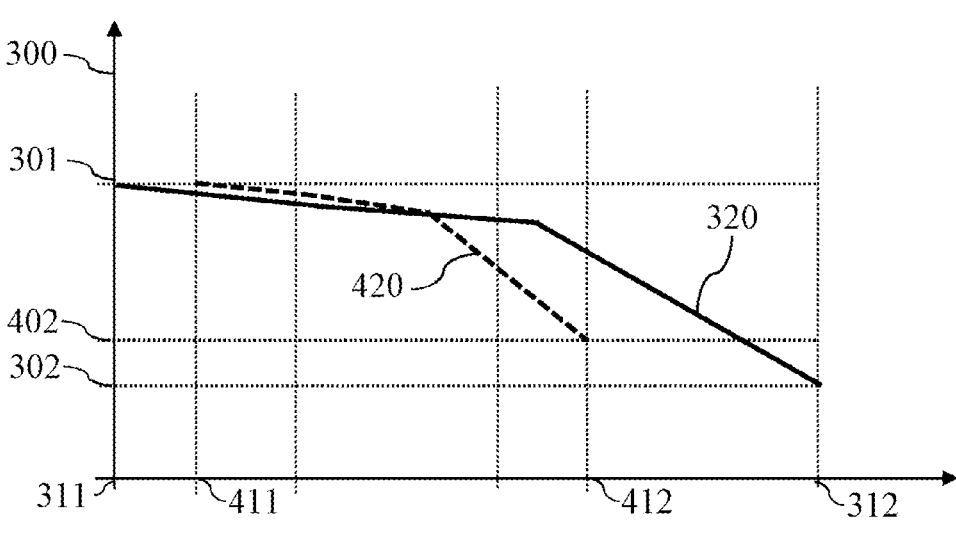
FIG. 4 shows example superimposition of target speed profiles of different route incidents.

FIG. 4 shows an example situation with a first target speed profile 320 for a first route incident 210 and a second target speed profile 420 for a second route incident 220. In this case, the first target speed profile 320 has such a high (spatial) total duration that the first route incident 210 already becomes relevant to the longitudinal guidance of the vehicle 100 (at the first intervention position 311 of the first target speed profile 320), even though the second route incident 220 is closer to the current vehicle position than the first route incident 210.

The (control) device 101 may be configured to check, on the basis of the first target speed profile 320 of the first route incident 210 that is already relevant, whether a second route incident 220 is arranged along the driving route between the first intervention position 311 and the first incident position 312 of the first route incident 210, in particular a second route incident 220 which, at the second incident position 412 of the second route incident 220, has a second incident speed 402 which is below the first target speed profile 320 of the first route incident 210.

If such a second route incident 220 is detected, the automated longitudinal guidance may be carried out (possibly also) analyzing the second route incident 220, in particular analyzing the second target speed profile 420 of the second route incident 220. In particular, the device 101 may be configured to prevent the automated longitudinal guidance according to the first target speed profile 320. The first route incident 210 can therefore initially be considered to be irrelevant to the longitudinal guidance (in particular between the first intervention position 311 and the second incident position 412). From the second intervention position 411 of the second target speed profile 420 for the second route incident 220, the automated longitudinal guidance can then be carried out according to the second target speed profile 420 (until the second incident position 412 is reached). In particular, the second target speed profile 420 can be used as a target specification for the speed controller of the vehicle 100.

The device 101 may also be configured to determine a residual target speed profile for the first route incident 210, which is designed to convert the driving speed 201 of the vehicle 100, starting from the second incident speed 402 at the second incident position 412, into the first incident speed 302 at the first incident position 312. This residual target speed profile can then be used as the target specification for the automated longitudinal guidance of the vehicle 100 from the second incident position 412 to the first incident position 312.

The driving function can therefore select the coasting curve, that is to say the target speed profile 320, for an upcoming route incident 210 for the automated longitudinal guidance. The coasting curve may indicate how the driving speed 201 of the vehicle 100 is reduced by means of successive coasting, overrun and control phases 321, 322, 323. While approaching the route incident 210, it may be the case that another route incident 220 with a higher relevance to the longitudinal guidance of the vehicle 100 is detected (on account of a higher deceleration demand). The reprioritization or switching to another coasting curve, that is to say to another target speed profile 420, may result in an uncomfortable driving behavior.

As stated further above, the deceleration strategies may be different for different types of route incidents 210, 220 (and are each possibly composed of coasting, overrun and control phases 321, 322, 323). Depending on the type of route incident 210, 220, a specific maximum distance (between the intervention position 311 and the incident position 312) may be used. This may result in the locally more remote route incident 210 (for example a speed limit) being output or becoming relevant even if the incident speed 402 for a route incident 220 (for example a bend) before it is exceeded as a result.

As described in this document, the relevant route incident 210, 220 can be selected by means of a cross-comparison of the deceleration strategies (in particular the predicted target speed profiles 320, 420) for the two route incidents 210, 220 (for example limit or bend). If the predicted speed profile 320 exceeds the target speed 402 of another route incident 220, which is not yet relevant to control (for example on account of the distance criterion with respect to the maximum distance), the output (that is to say the consideration in the automated longitudinal guidance) is suppressed until the locally closer route incident 220 is reached and/or becomes relevant.

The driving function may be designed in such a manner that a detected speed limit as a route incident 220 must be manually accepted by the driver of the vehicle 100 before the speed limit is taken into account in the automated longitudinal guidance of the vehicle 100. In this case, the target speed profile 320 can typically be determined only from the point in time or the position at which the driver accepts the detected speed limit.

The device 101 may be configured to terminate the suppression of the route incident 210 (that is to say the speed limit) when a linearized target deceleration threshold is exceeded or a minimum control time is undershot.

As stated in this document, the suppression of the route incident 210 can normally be ended or terminated when the locally closer route incident 220 is reached. However, the suppression of the subsequent (already relevant) route incident 210 may possibly be terminated even before the preceding route incident 220 is reached, for example if the (maximum possible or permissible) target deceleration of the vehicle 100 has already been achieved (in order to be able to brake to the subsequent route incident 210). This makes it possible to achieve particularly reliable automated deceleration to route incidents 210, 220.

In a further example, the suppression of the subsequent (already relevant) route incident 210 can be terminated even before the preceding route incident 220 is reached if, as a result of the termination, a specific minimum control period for considering the preceding route incident 220 (and associated with this, a specific minimum period for displaying the preceding route incident 220) would be reached or undershot. The comfort of the automated deceleration can therefore be increased further since relatively brief control phases and/or relatively short-term transitions between different route incidents 210, 220 (relevant to control) can be avoided. Furthermore, a lightning change in the display on account of changing route incidents 210, 220 can be avoided.

In one example, a vehicle 100 with the driving function ACC, the automatic acceptance of speed limits and the automatic consideration of structural route incidents (for example bends) is driving on a road, for example at a set and/or actual speed 201 of 108 km/h. At a distance 211 of 750 m, there is a speed limit of 50 km/h. Furthermore, at a distance of 400 m, there is a bend with a target speed of 78 km/h.

It is identified, on the basis of the deceleration strategies of the two upcoming route incidents 210, 220, that the deceleration strategy for the speed limit is relevant at the current vehicle position, but the deceleration strategy for the bend is not yet relevant. Furthermore, it is clear from the deceleration strategy (that is to say the speed profile 320) for the speed limit that the target speed for the bend will be exceeded at the location 412 of the bend.

The device 101 may be configured to suppress the consideration of the deceleration strategy for the speed limit. As the bend incident is approached, it becomes relevant to control and is output. After driving through the bend, the speed limit is then output and is relevant to control.

Figure 5:
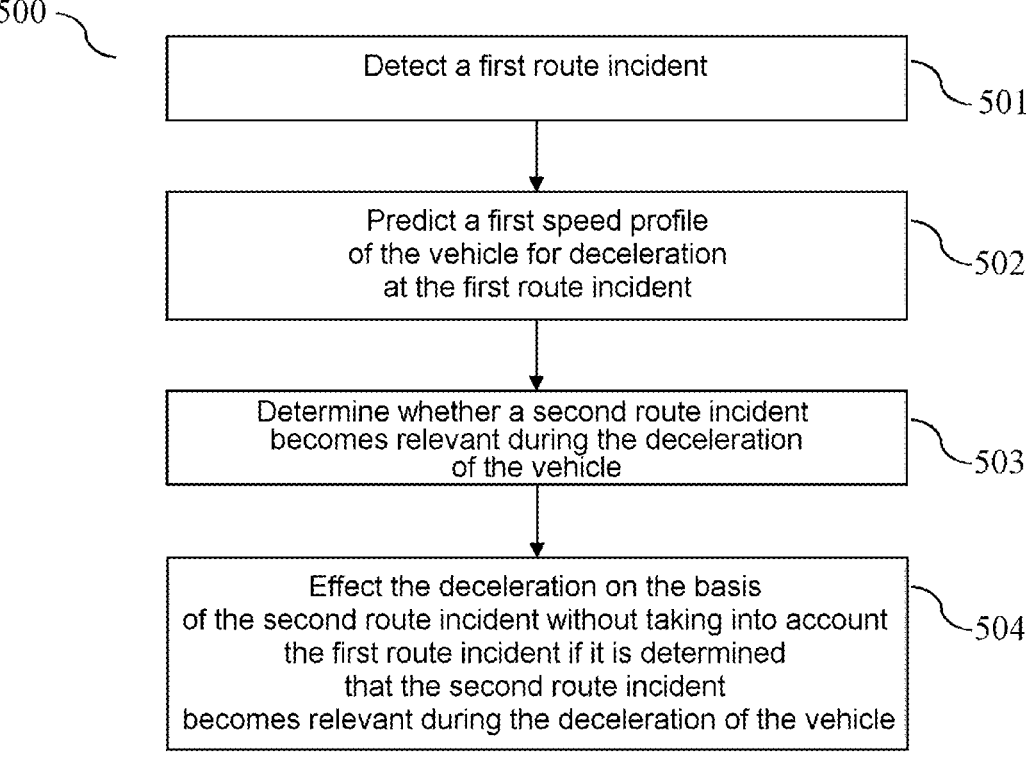
FIG. 5 shows a flowchart of an example method for analyzing route incidents in the automated longitudinal guidance of a vehicle.

FIG. 5 shows a flowchart of a (possibly computer-implemented) method 500 for analyzing upcoming route incidents 210, 220 on a driving route of a vehicle 100 in the automated longitudinal guidance of the vehicle 100. The method 500 can be carried out by a control device 101 of the vehicle 100.

The method 500 comprises detecting 501 a first upcoming route incident 210 at a first incident position 312 on the driving route of the vehicle 100. The first route incident 210 may be determined on the basis of a digital map (which is provided within a navigation system, for example). The incident position 312 and possibly an incident speed 302 associated with the route incident 210 can be determined from the digital map.

The method 500 also comprises determining 502 a first speed profile 320, in particular a first target speed profile 320, of the vehicle 100 up to the first incident position 312, assuming that the first route incident 210 is considered in the automated longitudinal guidance of the vehicle 100. It is possible to determine, in particular, a first (target) speed profile 320 which is used to decelerate the vehicle 100, starting from an initial speed 301 at a first intervention position 311 (for example at the current vehicle position), to the first incident speed 302 at the first incident position 312. This first (target) speed profile 320 can be used to control the speed during the automated longitudinal guidance of the vehicle 100 (apart from when a second relevant route incident 220 is detected).

The method 500 also comprises determining 503, on the basis of the first speed profile 320, whether or not a second route incident 220 becomes relevant to the automated longitudinal guidance of the vehicle 100 before the first incident position 312 is reached. In particular, it is possible to determine (for example on the basis of the digital map) whether a second route incident 220, which is relevant to setting the longitudinal speed of the vehicle 100 before the first incident position 312 is reached, is arranged on the upcoming driving route. In particular, it is possible to identify a second route incident 220 which does not yet influence the automated longitudinal guidance of the vehicle 100 at the first intervention position 311 (for example at the current vehicle position), but will influence the automated longitudinal guidance of the vehicle 100 during the journey up to the first incident position 312.

It is therefore possible to check, even before the start of the automated longitudinal guidance (in particular the automated deceleration), with respect to a first route incident 210 whether a second route incident 220 (which is not yet relevant at the current vehicle position) will also become relevant during the automated longitudinal guidance up to the first incident position 312 of the first route incident 210.

The method 500 also comprises affecting 504 the automated longitudinal guidance of the vehicle 100 on the driving route up to the first incident position 312 at least in certain areas on the basis of the second route incident 220 if it is determined that the second route incident 220 becomes relevant to the automated longitudinal guidance of the vehicle 100 before the first incident position 312 is reached.

The second route incident 220 may be relevant to the automated longitudinal guidance of the vehicle 100, for example from a second intervention position 411, wherein the second intervention position 411 is arranged between the first intervention position 311 and the first incident position 312. It may be the case that neither the first nor the second route incident 210, 220 is considered in the automated longitudinal guidance of the vehicle 100 until the second intervention position 411 is reached. Manual longitudinal guidance or automated longitudinal guidance according to ACC may then be carried out.

From the second intervention position 411, the second target speed profile 420 for the second route incident 220 may then be used for the automated longitudinal guidance of the vehicle 100 (until the second incident position 412 is reached).

The measures described in this document can be used to robustly and efficiently increase the driving comfort when considering route incidents 210, 220 in the automated longitudinal guidance of a vehicle 100.

The present subject matter is not restricted to the examples shown. In particular, it should be noted that the description and the figures are intended to illustrate only by way of example the principle of the proposed methods, devices and systems.

What is claimed is:

1. An electronic device for analyzing upcoming route incidents on a driving route of a vehicle in an automated longitudinal guidance of the vehicle, comprising:
   a processor; and
   a memory in communication with the processor and configured to store instructions executable by the processor to configure the electronic device to:
      detect a first upcoming route incident at a first incident position on the driving route of the vehicle;
      determine a first speed profile of the vehicle up to the first incident position based on the first route incident in the automated longitudinal guidance of the vehicle;
      determine, based on the first speed profile, whether a second route incident will become relevant to the automated longitudinal guidance of the vehicle before the first incident position is reached by the vehicle; and
      control the automated longitudinal guidance of the vehicle on the driving route up to the first incident position based on the second route incident upon determining that the second route incident will become relevant to the automated longitudinal guidance of the vehicle before the first incident position is reached.

2. The electronic device according to claim 1, wherein the instructions further configure the electronic device to:
   determine a target speed which the vehicle should or should not exceed on account of the second route incident at a specific position before the first incident position is reached; and
   compare the target speed with a first speed indicated by the first speed profile at the specific position; and
   determine, based on the comparison, whether or not the second route incident becomes relevant to the automated longitudinal guidance of the vehicle before the first incident position is reached.

3. The electronic device according to claim 2, wherein
   the second route incident is associated with a second incident speed which the vehicle should or should not exceed at a second incident position; and
   the second incident speed corresponds to the target speed and the second incident position corresponds to the specific position.

4. The electronic device according to claim 3, wherein the instructions further configure the electronic device to:
   upon determining that the second route incident will become relevant to the automated longitudinal guidance of the vehicle before the first incident position is reached:
      determine a second target speed profile based on the second incident speed of the second route incident such that a driving speed of the vehicle, starting from an initial speed at a second intervention position, is reduced to the second incident speed at the second incident position; and
      control the automated longitudinal guidance of the vehicle on the driving route up to the second incident position based on the second target speed profile.

5. The electronic device according to claim 4, wherein the instructions further configure the electronic device to:
   determine a residual target speed profile based on a first incident speed of the first route incident at the first incident position such that the driving speed of the vehicle, starting from the second incident speed at the second incident position, is reduced to the first incident speed at the first incident position; and
   control the automated longitudinal guidance of the vehicle on the driving route from the second incident position up to the first incident position based on the residual target speed profile.

6. The electronic device according to claim 4, wherein
   the first speed profile corresponds to a first target speed profile for the first route incident for the automated longitudinal guidance of the vehicle from a first intervention position;
   the first intervention position is arranged before the second intervention position in a direction of travel of the vehicle; and
   the instructions further configure the electronic device to:
      ignore the first target speed profile for the first route incident during the automated longitudinal guidance of the vehicle between the first intervention position and the second intervention position upon determining that the second route incident will become relevant to the automated longitudinal guidance of the vehicle before the first incident position is reached.

7. The electronic device according to claim 6, wherein
   the first route incident is associated with a first incident speed which the vehicle should or should not exceed at the first incident position; and
   the instructions to further configure the electronic device to:
      determine the first speed profile based on the first incident speed of the first route incident such that a driving speed of the vehicle, starting from an initial speed at a first intervention position, is reduced to the first incident speed at the first incident position.

8. The electronic device according to claim 7, wherein the instructions to further configure the electronic device to:
   use the first speed profile as the first target speed profile for the automated longitudinal guidance of the vehicle up to the first incident position upon determining that the second route incident will become relevant to the automated longitudinal guidance of the vehicle before the first incident position is reached.

9. The electronic device according to claim 1, wherein the instructions further configure the electronic device to:
   recognize the first route incident and/or the second route incident based on a digital map of a road network used by the vehicle, wherein the first route incident and/or the second route incident comprise(s) a speed limit or a bend in the road network.

10. The electronic device according to claim 1, wherein
   the first route incident has a first type;
   the second route incident has a second type; and
   the instructions further configure the electronic device to:
      determine, for a route incident of the first type, a first target speed profile for automated deceleration that extends over a longer total distance than a second target speed profile for automated deceleration for a route incident of the second type.

11. The electronic device according to claim 1,
wherein a route incident is associated with an incident speed which the vehicle should or should not exceed at an incident position; and
the instructions further configure the electronic device to:
    determine a target speed profile for automated deceleration of the vehicle up to the incident position, wherein the target speed profile comprises different phases, wherein the different phases comprise a coasting phase, an overrun phase, and/or a braking phase, and wherein a composition and/or duration of the different phases is/are different for different types of route incidents.

12. A method for analyzing upcoming route incidents on a driving route of a vehicle during automated longitudinal guidance of the vehicle, comprising:

detecting a first upcoming route incident at a first incident position on the driving route of the vehicle;

determining a first speed profile of the vehicle up to the first incident position based on the first route incident in the automated longitudinal guidance of the vehicle;

determining, based on the first speed profile, whether a second route incident will become relevant to the automated longitudinal guidance of the vehicle before the first incident position is reached by the vehicle; and controlling the automated longitudinal guidance of the vehicle on the driving route up to the first incident position based on the second route incident upon determining that the second route incident will become relevant to the automated longitudinal guidance of the vehicle before the first incident position is reached.

* * * * *